United States Patent [19]

Murakami et al.

[11] 4,033,368
[45] July 5, 1977

[54] GOVERNOR PRESSURE CONTROL APPARATUS FOR VEHICLE AUTOMATIC TRANSMISSION

[75] Inventors: Noboru Murakami, Nagoya; Tsunehiko Ogasahara, Kariya, both of Japan

[73] Assignee: Aisin Seiki Kabushiki Kaisha, Toyota, Japan

[22] Filed: Sept. 4, 1975

[21] Appl. No.: 610,410

[30] Foreign Application Priority Data

Oct. 3, 1974   Japan ............................ 49-114193

[52] U.S. Cl. .................................................. 137/54
[51] Int. Cl.² ......................................... G05D 13/36
[58] Field of Search ................. 91/458; 137/54, 56, 137/58

[56] References Cited

UNITED STATES PATENTS

| | | |
|---|---|---|
| 2,711,749 | 6/1955 | Hettinger ............................ 137/54 |
| 3,151,622 | 10/1964 | Hause ................................. 137/54 |
| 3,394,622 | 7/1968 | Chana ............................. 137/54 X |
| 3,677,277 | 7/1972 | Hirozawa ............................ 137/54 |

Primary Examiner—Robert G. Nilson
Attorney, Agent, or Firm—Pierce, Scheffler & Parker

[57] ABSTRACT

The invention relates to a governor pressure controlling apparatus for vehicle transmissions including a governor pressure generator mounted on a rotational shaft for generating a governor pressure and provided with inlet and outlet ports, a governor pressure regulator provided with inlet and outlet ports and a regulating chamber, a first passage for communicating the inlet port of the governor pressure generator with a source of fluid pressure, a second passage for communicating the outlet port of the governor pressure generator with an inlet port of the governor pressure regulator, and a third passage for communicating another inlet port of the governor pressure regulator with the source of fluid pressure, whereby the regulated pressure obtained at the outlet port of the governor pressure regulator is controlled by governor pressure obtained from the governor pressure generator according to the rotational speed of the rotational shaft.

3 Claims, 8 Drawing Figures

GOVERNOR PRESSURE CONTROL APPARATUS FOR VEHICLE AUTOMATIC TRANSMISSION

BACKGROUND OF THE INVENTION

1. Field of the Invention

The present invention relates generally to a governor pressure controlling apparatus, and more particularly to a governor pressure controlling apparatus of automatic transmission for vehicles.

2. Description of the Prior Art

Generally, an automatic speed changing position is established according to a vehicle speed in an automatic transmission for vehicles, that is, speed changing is accomplished by governor pressure generated by a governor pressure generator which is changeable according to he vehicle speed. This is clearly represented in FIG. 1 and the formula is as follows:

$$P = C\ m\ r\ w^2$$

- $P$ : oil pressure
- $C$ : coefficient
- $m$ : weight of governor valve
- $r$ : rotational radius of governor valve
- $w$ : angular speed of shaft The governor pressure is in proportion to square of speed and is sensitive to the vehicle speed as best seen from the abovementioned formula. For example, when the governor pressure is set on the low speed side as shown at curved line 1 — 1 in FIG. 1, the governor pressure is quickly increased according to an increase of vehicle speed and exceeds the controlling oil pressure ( line pressure ) of the automatic transmission upon high speed of the vehicle, thereby making it difficult for detecting the vehicle speed, and when the governor pressure is set on the high speed side as shown at curved line 1 - 2 in FIG. 1, the governor pressure is low. When the vehicle speed is low and there is danger that the vehicle speed may not be detected, so that normally at least two kinds of governor pressure, namely, governor pressure for low and high vehicle speeds is provided. The governor pressure generator is generally arranged at the rear portion of the transmission and an oil pressure control apparatus fluidically connected to the governor pressure generator via a conduit, is generally arranged at the lower portion or a side portion of the transmission. Therefore, if the conduit connecting the governor pressure generator with the oil pressure control apparatus is short, it becomes advantageous to design and construct the whole governor pressure controlling apparatus.

However, in a conventional governor pressure controlling apparatus, separate governor pressure generates are disposed on a rotational shaft, for example, when two kinds of governor pressure are employed, two governor pressure generators should be arranged on the rotational shaft, and a conduit provided for transmitting the line pressure to the governor pressure generator and to the oil pressure control apparatus and also two conduits for transmitting two different governor pressures should be connected thereto. When more than three governor pressures are employed, at least four conduits are required.

SUMMARY OF THE INVENTION

It is, therefore, an object of the present invention to provide an improved governor pressure controlling apparatus for automatic transmissions for vehicles adapted for obviating the aforementioned drawback of conventional apparatus.

It is another object of the present invention to provide a unique and highly simplified governor pressure controlling apparatus for automatic transmissions for vehicles.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE ILLUSTRATED EMBODIMENTS

Figure 3:
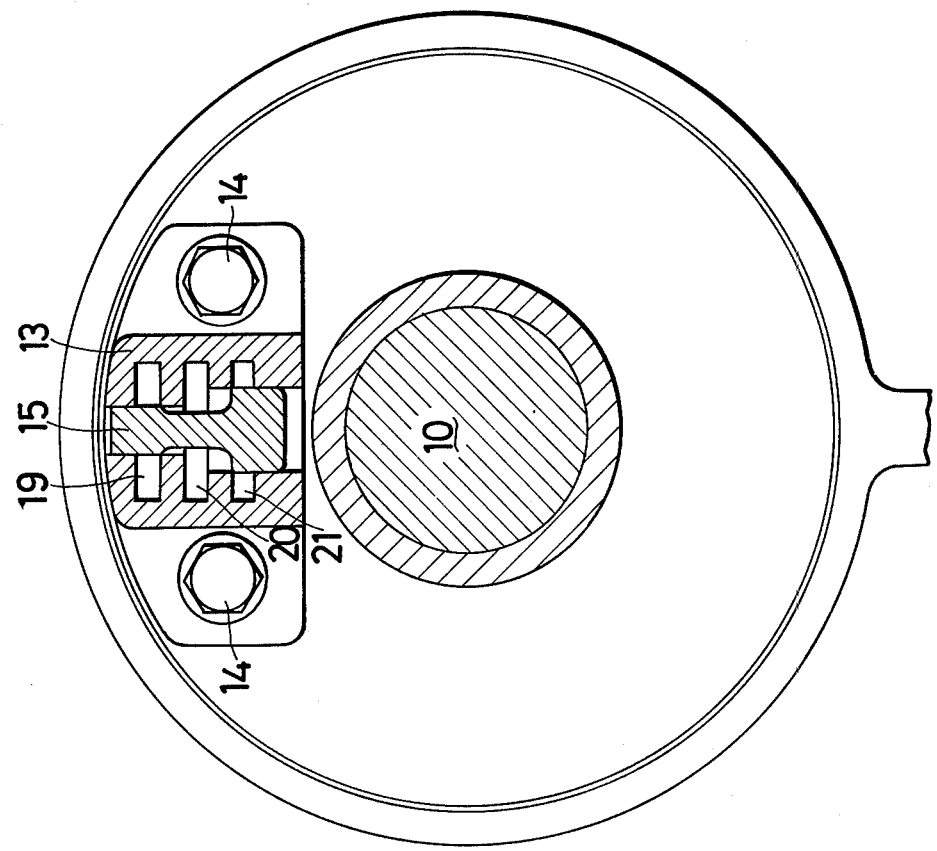
FIG. 3 is a view similar to FIG. 2 taken along the line A — A of FIG. 2.
Figure 2:
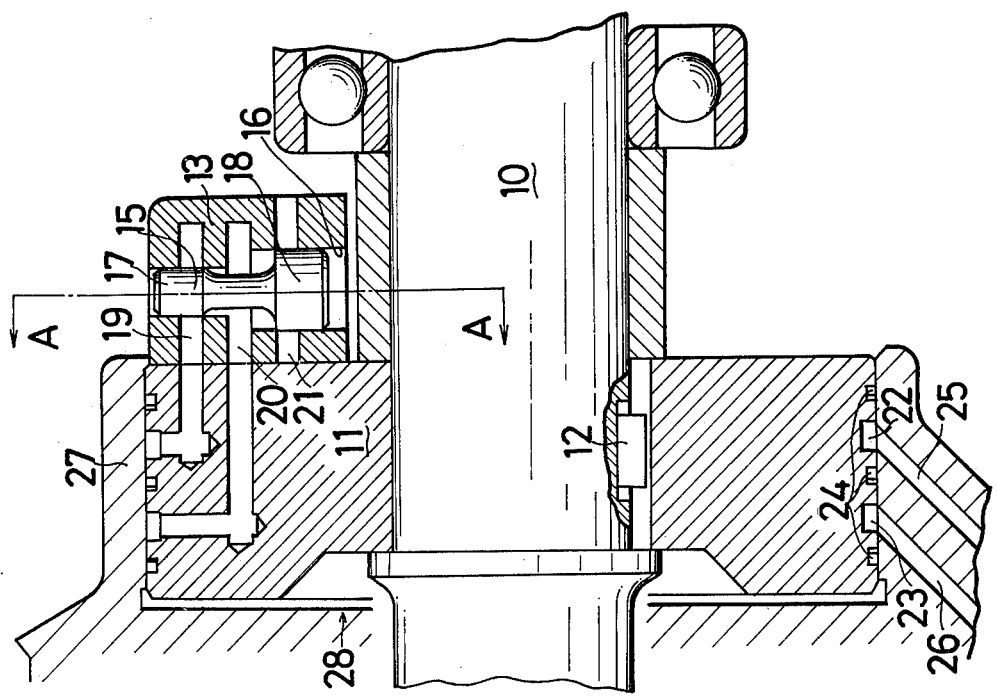
FIG. 2 is a sectional view of governor pressure generator according to the invention.

Referring now to the first embodiment of the invention, especially FIGS. 2, and 3, the reference numeral 10 denotes an output shaft of a transmission and a support 11 for a governor pressure generator is fixed for rotation thereon by a key 12. A generator body 13 is fitted to the support 11 by means of bolts 14, (FIG. 3) and a governor valve 15 is disposed within a stepped cylinder bore 16 of the generator body 13 and is provided with a small diameter land 17 and a large diameter land 18. Ports 19, 20, 21 are provided in the body 13. The port 19 serves as an inlet port of line pressure and is communicated with a groove 22 provided on the peripheral surface of the support 11. The port 20 serves as an outlet port for governor pressure and is communicated with a groove 23 provided on the peripheral surface of the support 11. The port 21 is open to the atmosphere. The grooves 22, 23 of support 11 are sealed by a plurality of sealing rings 24 and communicate with passages 25, 25 respectively, formed in the fixed member 27 of the transmission. The passage 25 is communicated with a source of fluid pressure, not shown, and the passage 26 is communicated with an oil pressure control apparatus which includes a governor pressure regulator as described hereinafter. The governor pressure generator 28 is constructed as abovementioned.

Figure 1:
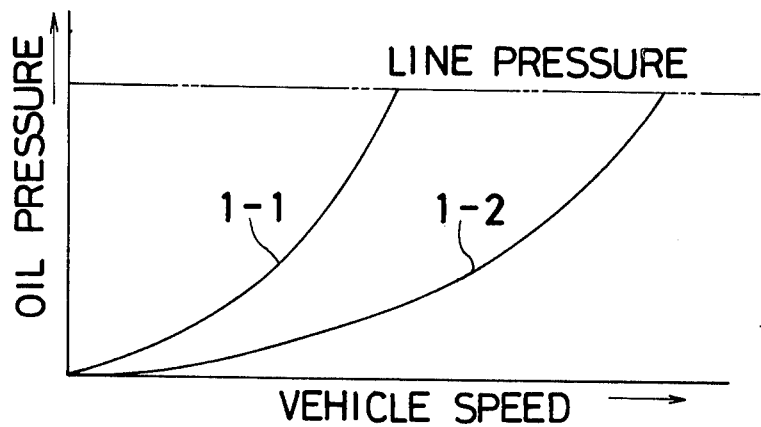
FIG. 1 is a graph showing governor pressure of the present invention.
Figure 4:
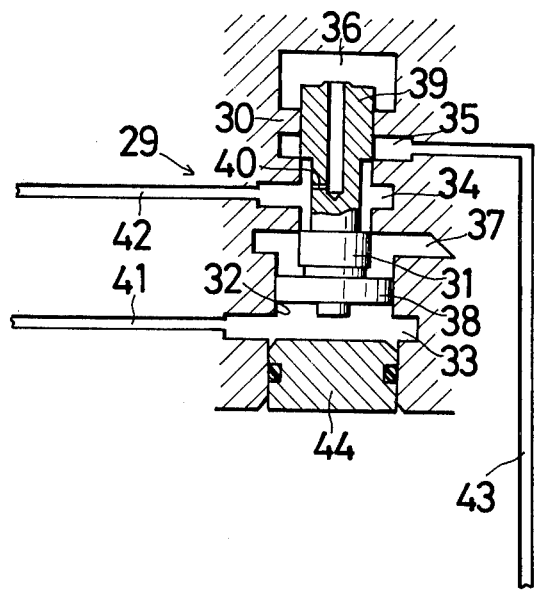
FIG. 4 is a view similar to FIG. 2, showing a first governor pressure regulator of the invention.

Next referring to FIG. 4, a governor pressure regulator 29 is provided on the side of the oil pressure control apparatus, not shown, and includes a valve body 30 and a valve 31 slidably disposed within the valve body 30. The valve body 30 is provided with a cylinder bore 32, ports 33, 34, 35, a chamber 36 and a drain port 37. The valve 31 is provided with a large diameter land 38, a small diameter land 39 having an orifice 40. The port 33 is communicated with the passage 26 (FIG. 2) via conduit 41 and the port 34 is an outlet port for regulated governor pressure via a conduit 42, and the port 35 is communicated with the source of fluid pressure, not shown, via a conduit 43. The reference numeral 44 shows a plug member for sealing the cylinder bore 32.

The operation according to the abovementioned embodiment will now be described hereinbelow in detail:

When the output shaft 10 is rotated, the governor valve 15 is upwardly moved by the centrifugal force in FIGS. 2, 3, thereby communicating the inlet port 19 of line pressure with the outlet port 20 of governor pressure. Accordingly, the fluid pressure supplied from the source of fluid pressure via passage 25, groove 22, inlet port 19 of line pressure is applied to the passage 26 via outlet port 20, groove 23, as governor pressure. When governor pressure is generated, the governor valve 15 is downwardly moved by the force of fluid pressure against the large land 18 shown in FIG. 2 and the governor pressure is balanced with the centrifugal force according to the rotational speed of shaft 10.

When the abovementioned governor pressure is supplied from the passage 26 in FIG. 2 to the port 33 of governor pressure regulator 29 via the conduit 41 in FIG. 4, the valve 31 is upwardly moved in FIG. 4, thereby communicating the port 35 with the port 34. Accordingly, the line pressure supplied from the conduit 43 becauses the new governor pressure ( governor modulated pressure ) in the conduit 42. Since the new governor pressure in the conduit 42 is supplied to the chamber 36 via the orifice 40, the valve 31 is downwardly moved by the new governor pressure ( governor modulated pressure ) in FIG. 4. The valve 31 is equilibrated at a predetermined valve determined by the ratio of the square of the diameters of the small and large diameter lands 39, 38 and the new governor pressure in conduit 42 is different from the governor pressure in hue 41 obtained from the governor pressure generator 28 (FIGS. 2 and 3) in proportion to the oil pressure within the conduit 41.

Figure 5:
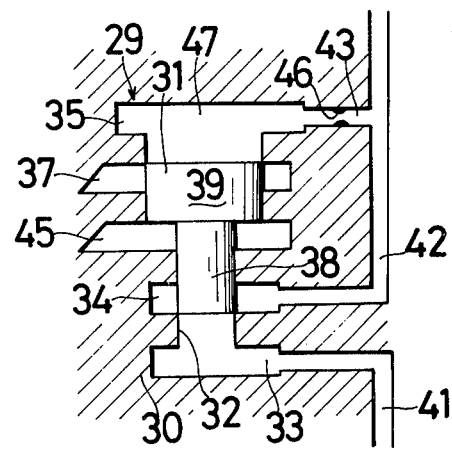
FIG. 5 is a view similar to FIG. 2, showing a second embodiment of governor pressure regulator.

Referring now to FIG. 5 showing a second embodiment of the invention, a governor pressure regulator 29 includes a valve body 30 and a valve 31 slidably disposed within the valve body 30. The valve body 30 is provided with a cylinder bore 32, ports 33, 34, 35 and drain ports 45 and 37. The valve 31 is provided with a small diameter land 38 and a large diameter land 39. The port 33 is communicated with the passage 26 via a conduit 41 and the ports 34, 35 are communicated with conduits 42 and 43 and an outlet port for governor modulated pressure. The reference numeral 46 denotes an orifice. When the governor pressure is supplied from the governor pressure generator 28 (FIG. 2) via passage 26 into the cylinder 32 via the conduit 41, the valve 31 is upwardly moved in FIG. 5, thereby obtaining the new governor modulated pressure in conduit 42. At this time, the modulated pressure in conduit 42 is supplied to a chamber 47 via the orifice 46, for downwardly moving the valve 31. The operation of this embodiment thereafter is similar to the first embodiment, so that the operation of this embodiment is omitted.

Figure 6:
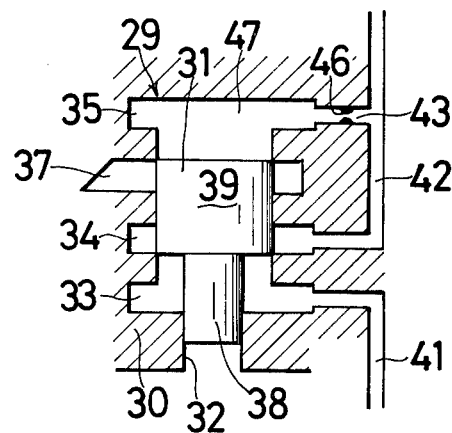
FIG. 6 is a view similar to FIG. 2, showing third embodiment of governor pressure regulator.

Referring to FIG. 6 showing a third embodiment of the invention, a governor pressure regulator 29 includes a valve body 30 and a valve 31 slidably disposed within the valve body 30. The valve body 30 is provided with a cylinder bore 32, ports 33, 34, 35 and a drain port 37. The valve 31 is provided with a small diameter land 38 and a large diameter land 39. The port 33 is communicated with the passage 26 via a conduit 41 and ports 34, 35 are communicated with conduits 42 and 43 as an outlet port for governor modulated pressure. The reference numeral 46 is an orifice. When the governor pressure is supplied from the governor pressure generator 28 (FIG. 2.) via passage 26 into the cylinder 32 via the conduit 41, the valve 31 is upwardly moved in FIG. 6, thereby obtaining the new governor modulated pressure from the conduit 42. At this time, the modulated pressure in conduit 42 is supplied to a chamber 47 via the orifice 46, for downwardly moving the valve 31. The operation of this embodiment thereafter is similar to the first embodiment, so that the operation of this embodiment is omitted.

Figure 7:
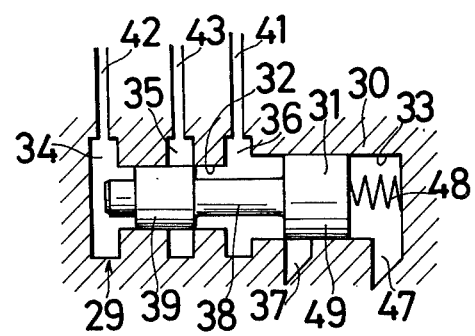
FIG. 7 is a view similar to FIG. 2, showing fourth embodiment of governor pressure regulator.
Figure 8:
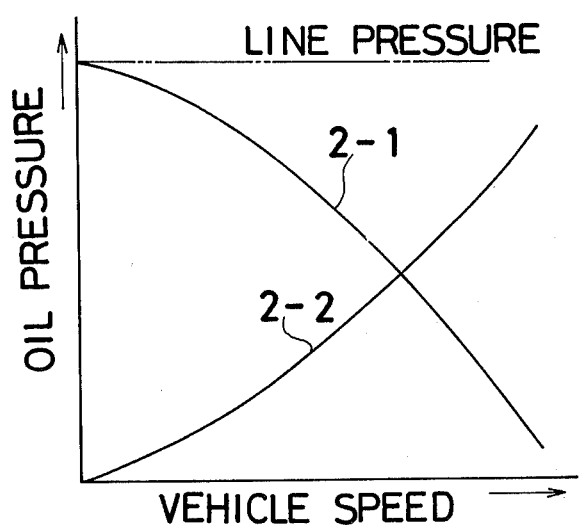
FIG. 8 is a graph similar to FIG. 1 showing governor pressure according to the governor pressure generator and regulator shown in FIGS. 2 and 7.

Next referring to FIG. 7 showing a fourth embodiment of the invention, a governor pressure regulator 29 includes a valve body 30, a valve 31 slidably disposed within the valve body 30, and a spring 48 acting on one end of the valve 31 against the governor pressure from the passage 26 via conduit 42 acts on the other end of the valve 31. The valve body 30 is provided with a first cylinder bore 32, a second cylinder bore 33 having a larger diameter than that of the first cylinder bore 32, ports 34, 35, 36 formed in the first cylinder bore 32, drain ports 37, 47 formed in the second cylinder bore 33. The valve 31 is provided with a small diameter land 38, intergrally formed at one end thereof and slidably disposed within the first cyclinder bore 32, an intermediate portion 39 and a large diameter land 49 integrally formed at the other thereof and slidably disposed within the second cylinder bore 33. The port 34 is communicated with the passage 26 via a conduit 42 and the port 35 is communicated with a conduit 43 for supplying line pressure and the port 36 is communicated with a conduit 41 as an outlet port for governor modulated pressure. When the valve 31 is leftwardly moved by a spring 48 in FIG. 7, the line pressure from the source of fluid pressure is supplied to the first cylinder bore 32 via the conduit 43, thereby obtaining the new governor modulated pressure in conduit 41, and the governor pressure via conduit 42 against the urging force of the spring 48 acts on the other end of the valve 31 via the conduit 42, the new governor modulated pressure is slowly decreased as the governor pressure in hue 42 slowly increases as shown in curved line 2 — 2 of FIG. 8, thereby obtaining a curved line 2 – 1 of FIG. 8.

The invention described and illustrated is believed to admit of many modifications within the ability of persons skilled in the art.

What is claimed as new and desired to be secured by letters patent of the United States is:

1. A governor pressure control apparatus for vehicle transmission, comprising:
   a source of fluid pressure;
   governor pressure generating means (28) mounted on a rotational shaft (10) for generating a governor pressure according to the rotation of said rotational shaft (10) and provided with an inlet port (19) fluidically communicated with said source of fluid pressure and an outlet port (20) for supplying a governor pressure; and
   governor pressure regulating means (29) including a valve body (30), a valve (31) slidably disposed within said valve body (30) and having a large diameter land (38) and a small diameter land (39), an inlet port (35) fluidically communicated with said source of fluid pressure, an outlet port (34) for supplying a governor modulated pressure, a port (33) for introducing said governor pressure from said outlet port (20) of said governor pressure generating means (28), and a regulating chamber (36) for acting against said governor pressure in order to regulate said inlet port (35) thereof;

whereby the governor pressure generated by said governor generating means (28) is applied against said large diameter land (38) of said governor pressure regulating means (29) and a governor modulated pressure is provided at outlet port (34) by said small diameter land (39) of said governor pressure regulating means (29) in accordance with the rotational speed of said rotational shaft (10).

2. A governor pressure control apparatus for vehicle transmission as set forth in claim 1, wherein said governor pressure regulating means (29) is separated from the governor pressure generating means (28) mounted on the rotational shaft (10).

3. A governor pressure controlling apparatus for vehicle transmission as set forth in claim 1, wherein said governor pressure generating means (28) further includes a governpr body (13), and a governor valve (15) sidably disposed within said governor body (13) and having a small diameter land (17) and a large diameter land (18).

* * * * *